United States Patent

Gamo et al.

[11] 4,160,014
[45] Jul. 3, 1979

[54] HYDROGEN STORAGE MATERIAL

[75] Inventors: Takaharu Gamo, Fujiidera; Yoshio Moriwaki, Moriguchi; Toshio Yamashita, Katano; Masataro Fukuda, Toyonaka, all of Japan

[73] Assignee: Matsushita Electric Industrial Co., Ltd., Japan

[21] Appl. No.: 905,176

[22] Filed: May 10, 1978

[30] Foreign Application Priority Data

May 10, 1977 [JP] Japan ................... 52-54140

[51] Int. Cl.$^2$ ............................................. C01B 6/02
[52] U.S. Cl. ................... 423/644; 75/134 M; 75/134 F; 75/134 V; 75/175.5
[58] Field of Search ............. 75/175.5, 134 M, 134 F, 75/134 V; 34/15; 423/644, 645, 248

[56] References Cited

U.S. PATENT DOCUMENTS

| 3,922,872 | 12/1975 | Reilly et al. ............... 75/175.5 |
| 4,040,410 | 8/1977 | Libowitz ................... 423/644 |
| 4,069,303 | 1/1978 | Yamadaya et al. ........... 75/134 M |

Primary Examiner—L. Dewayne Rutledge
Assistant Examiner—Peter K. Skiff
Attorney, Agent, or Firm—Wenderoth, Lind & Ponack

[57] ABSTRACT

An economical metallic material for storage of hydrogen comprising an alloy representable by the formula AB$\alpha$ in which "A" comprises from 50 to under 100 atomic percent of titanium and the remainder which is at least one element selected from the group I consisting of zirconium and hafnium, B comprises from 30 to below 100 atomic percent of manganese and the remainder which is at least one element selected from the group II consisting of chromium, vanadium, niobium, tantalum, molybdenum, iron, cobalt, nickel, copper and rare earth elements, and $\alpha$ is a value indicating a ratio of B to A, and is in the range of 1.0 to 3.0.

The materials of the invention very easily absorb large amounts of hydrogen and efficiently release it at other predetermined temperatures, pressures and electrochemical conditions, whereby it is able to store hydrogen safely, usefully and economically.

6 Claims, 14 Drawing Figures

HYDROGEN STORAGE MATERIAL

This invention relates to material for storage, and transport of hydrogen and especially to a polyelement alloy system including at least Ti and Mn.

It is generally known that hydrogen is stored in a high pressure vessel under a high pressure or is stored as a cryogenic liquid, being cooled to an extremely low temperature. However, both methods described above require a special vessel to store hydrogen. In the former method, an amount of hydrogen which may be stored in unit volume of the vessel is small because of the small hydrogen density, even though hydrogen is compressed to a pressure higher than 100 atm. The latter method requires prudential countermeasures for evaporation of liquid hydrogen by external heat. In both methods, the storage device becomes extremely large, therefore it is inconvenient for carrying and is impractical.

It is known that some kinds of metal or alloy store hydrogen and release it reversibly. This is considered to be an excellent hydrogen storage method because the amount of hydrogen absorption in a unit volume of metal is large. A reaction using this method is a solid-gas reaction with exothermic heat of $-\Delta H_f$ [K cal/mol.H$_2$] via the following reaction:

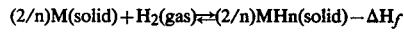

Namely, the metal or alloy in a solid state absorbs hydrogen with high density under conditions of peculiar temperature and pressure of hydrogen gas or under electrochemical conditions, so that it forms metal hydride (MHn), and is able to store the large amount of hydrogen. The metal or alloy (M) releases hydrogen reversibly by changing above conditions. A metal hydride is able to safely store for a very long time hydrogen with density as great as that of liquid hydrogen, because it is formed by intrusion of hydrogen atoms into crystal lattice of a metal.

A variety of metallic materials for storing hydrogen has hitherto been proposed, typical examples being Mg, Mg-Ni, Mg-Cu alloys, Ti-Fe, Ti-Ni alloys, R-Ni, R-Co alloys (where R is a rare-earth element).

Of these materials, the Mg alloy systems, for example, permit storage of a comparatively large amount of hydrogen per a unit weight of storage material. However when Mg alloys are employed, considerable amounts of thermal energy must be supplied to effect release of stored hydrogen, because the dissocation equilibrium pressure (which is the pressure of plateau region of hydrogen dissociation pressure-hydride composition isotherm) at room temperature is very low, and moreover release of hydrogen can be effected only in conditions of high temperatures exceeding 250° C. and even in these conditions the release have to be performed for a long time with consumption of a large amount of energy. In contrast with this, rare earth alloys have the dissociation pressure in the order of several atmospheric pressures at room temperature, therefore they can absorb and release hydrogen efficiently and comparatively rapidly at room temperature. However, these alloys have a deficiency such that an amount of storable hydrogen per unit weight of the alloys is slightly less than that in other types of storage material and that they are extremely expensive. Of the titanium alloys, the material which has been considered to be most promising is TiFe, which is advantageous in that it is comparatively cheap and that the dissociation pressure of hydrogen combined therewith is several atmospheres pressure at room temperature. However, TiFe also has disadvantages such that it requires a high temperature above about 350° C. and high pressures above about 30 atmospheres for initial hydrogenation thereof, that the rates of absorption and desorption of hydrogen are comparatively slow, and that it exhibits a certain degree of hysteresis in the hydrogen absorption and desorption cycle and it is difficult to desorb a complete amount of hydrogen absorbed by the material.

It is accordingly a principal object of the invention to provide an improved hydrogen storage material in which the dissociation pressure of combined hydrogen is several atmospheric pressures at room temperature, which is able to absorb and desorb hydrogen at high rates under normal temperature conditions, and which is of comparatively low cost.

It is a further object of the invention to provide a hydrogen storage material which is suitable for use as media for storage, preservation and transport of hydrogen gas.

According to the present invention there is provided a metallic material for storage of hydrogen comprising an alloy representable by the formula AB$_\alpha$ in which A comprises from 50 to below 100 atomic percent of titanium and the remainder which is at least one element selected from the group I consisting of zirconium and hafnium, B comprises from 30 to below 100 atomic percent of manganese and the remainder which is at least one element selected from the group II consisting of chromium, vanadium, niobium, tantalum, molybdenum, iron, cobalt, nickel, copper and rare earth elements, and $\alpha$ is value indicating a ratio of B to A in a range of 1.0 to 3.0.

In preferred embodiments of the present invention, said substance of metallic material able to store hydrogen is constituted substantially by a Ti-Zr-Mn-Cr-V alloy, Ti-Zr-Mn-Cr-Fe alloy, Ti-Zr-Mn-Cr-Cu alloy or Ti-Zr-Mn-V-Mo alloy.

The many advantages achieved by the use of the material of the invention may be appreciated from the following detailed description of several preferred embodiments thereof when read in reference to the attached drawings, in which FIG. 1 is a phase diagram of a Ti-Mn binary alloy system on which this invention is based;

Figure 13:
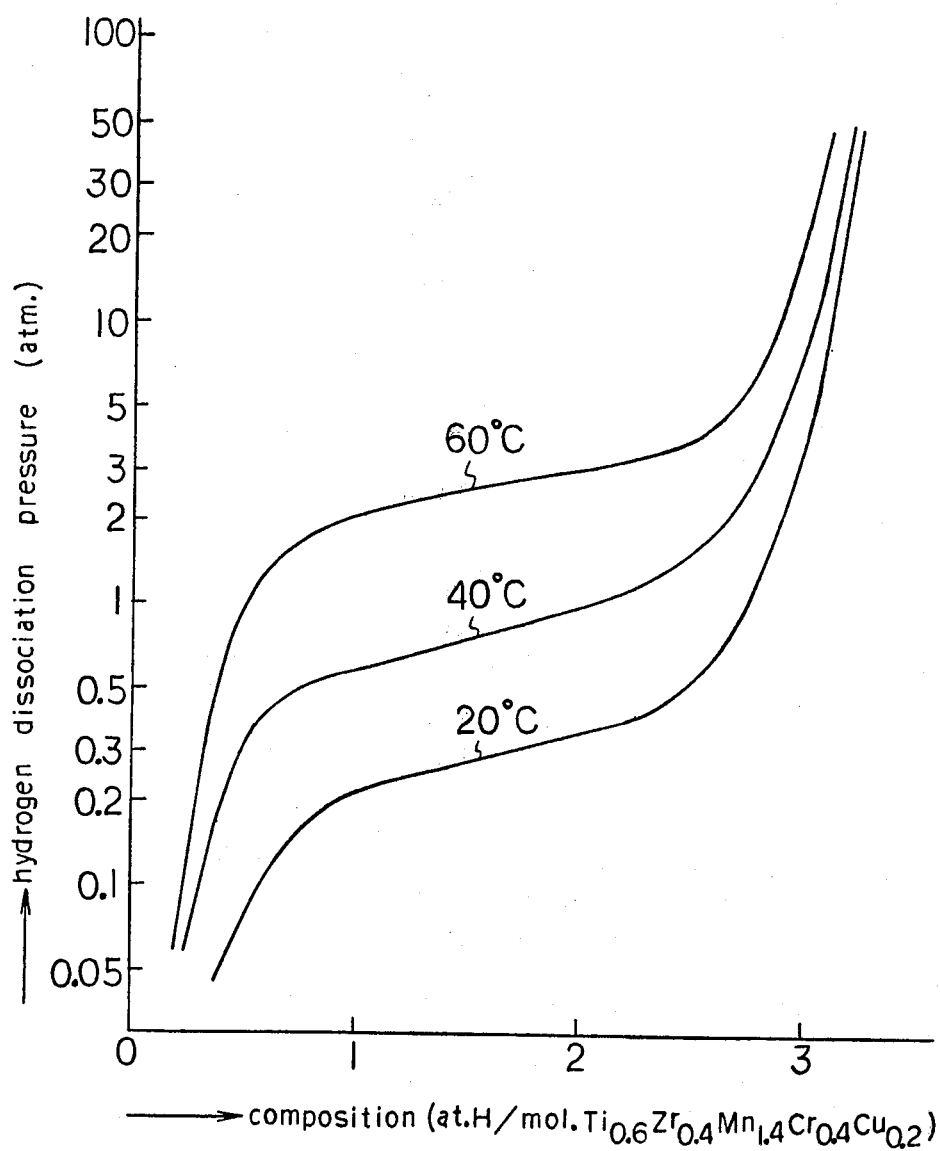
Figure 14:
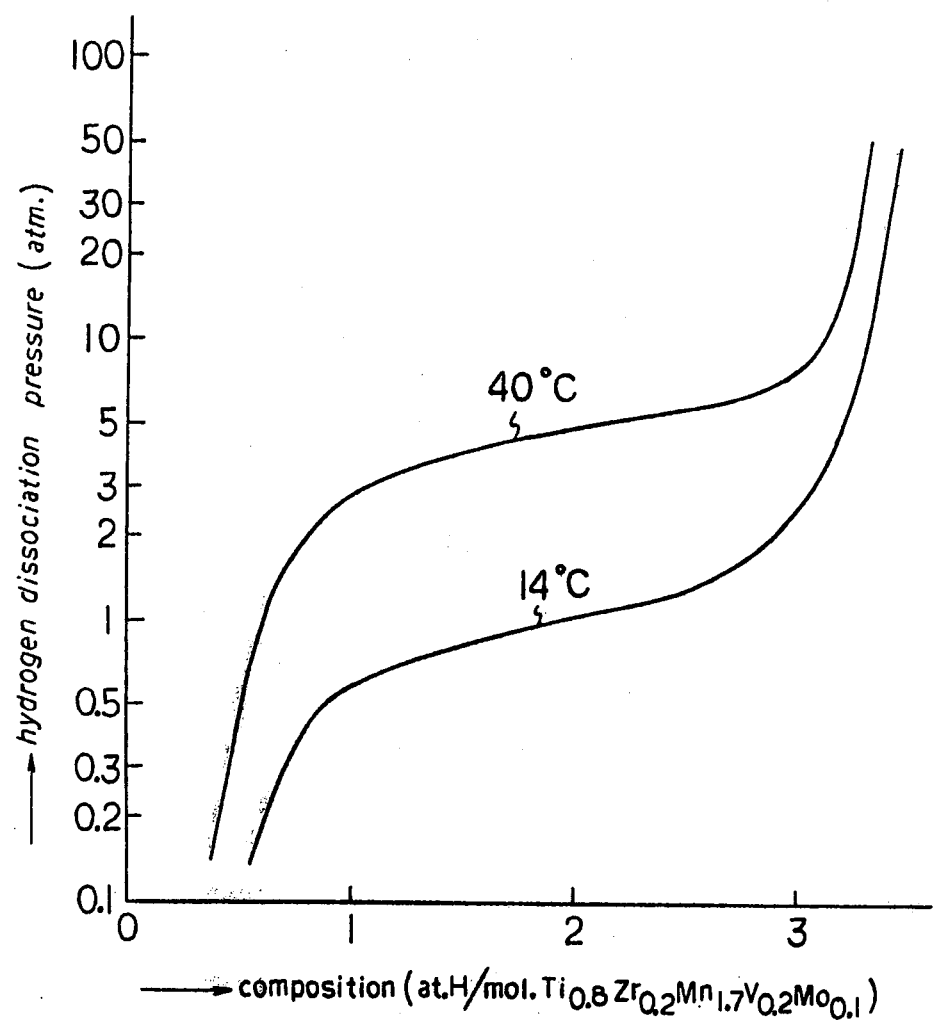

FIG. 13 is a graph which plots hydrogen dissociation equilibrium pressure-composition isotherms for the $Ti_{0.6}Zr_{0.4}Mn_{1.4}Cr_{0.4}Cu_{0.2}$—H system by way of example of the hydrogenation characteristics of a Ti-Zr-Mn-Cr-Cu alloy according to the invention; and FIG. 14 is a graph which plots hydrogen dissociation equilibrium pressure-composition isotherms for the $Ti_{0.8}Zr_{0.2}Mn_{1.7}V_{0.2}Mo_{0.1}$—H system by way of example of the hydrogenation characteristics of a Ti-Zr-Mn-V-Mo alloy according to the invention.

A suitable method of manufacturing the alloys according to the present invention will be described in the following. There are prepared bars of 99% pure titanium, 99% pure sponge zirconium, plates of 99% pure electrolytic manganese, plates of 99% chromium and 99% pure vanadium flakes and so on, these materials being commertially available. These materials are melted together in an argon arc furnace, so that alloys having the described formula such as $Ti_{1-x}Zr_xMn_{2-y-z}Cr_yV_z$ are formed for a short time. Then, the alloys are positioned in a pressure-resistant reaction vessel, gases in the reaction vessel being evacuated previously. Thereafter, 99.9% pure hydrogen gas is introduced into the reaction vessel and when the pressure of the hydrogen gas in the vessel reaches to approximately 20 atm., the reaction vessel is sealed. In this condition, the alloys absorb hydrogen rapidly at room temperature to form metal hydrides having, for example, the composition of $Ti_{0.9}Zr_{0.1}Mn_{1.4}Cr_{0.4}V_{0.2}$—$H_{3.2}$. Thus, hydrogen is stored in the alloys in the form of a metal hydride. If it is desired to release hydrogen from the hydrides, the pressure of hydrogen gas in the reaction vessel is reduced or an ambient temperature is increased. By these operations, hydrogen is released from the alloys and is again available as gaseous hydrogen.

In the following Table, there are shown hydriding characteristics such as the amount of absorbed and released hydrogen and the hydrogen releasing ratio which is the ratio of the amount of released hydrogen to the amount of absorbed hydrogen; and the crystal lattice parameters a and c in the alloys having a Laves phase with a hexagonal crystal structure of the $MgZn_2(C_{14})$ type.

Table

| Hydrogen storage alloy composition | Hydrogenation temp. (°C.) | Qty. absorbed hydrogen at. H mol.Alloy | Qty. absorbed hydrogen $H_2$(cc, at 20° C.) Alloy wt.(g) | Qty. released hydrogen Release ratio (%) | Qty. released hydrogen $H_2$(cc, at 20° C.) Alloy wt. (g) | Crystal lattice parameters a (A) | Crystal lattice parameters c (A) |
|---|---|---|---|---|---|---|---|
| $Ti_{0.8}Zr_{0.2}Mn_{1.2}Cr_{0.8}$ | 0 | 3.23 | 236 | 89 | 209 | 4.893 | 8.054 |
|  | 20 | 3.15 | 226 | 92 | 207 |  |  |
| $Ti_{0.8}Zr_{0.2}Mn_{0.5}Cr_{1.5}$ | 24 | 2.32 | 174 | 75 | 132 | 4.884 | 8.011 |
|  | 20 | 3.25 | 236 | 14 | 33 |  |  |
| $Ti_{0.8}Zr_{0.2}Mn_{1.7}V_{0.3}$ | 60 | 3.02 | 219 | 87 | 190 | 4.902 | 8.049 |
|  | 0 | 1.18 | 81 | 26 | 21 |  |  |
| $Ti_{0.7}Zr_{0.3}Mn_{1.6}Ni_{0.4}$ | 40 | 0.19 | 13 | 82 | 11 | 4.891 | 7.986 |
|  | 20 | 2.97 | 197 | 35 | 69 |  |  |
| $Ti_{0.6}Zr_{0.4}Mn_{1.7}Ni_{0.3}$ | 40 | 2.80 | 190 | 72 | 136 | 4.903 | 8.024 |
|  | 20 | 2.45 | 168 | 23 | 38 |  |  |
| $Ti_{0.6}Zr_{0.4}Mn_{1.9}Fe_{0.1}$ | 60 | 2.14 | 146 | 74 | 109 | 4.907 | 8.084 |
|  | 0 | 1.56 | 116 | 90 | 104 |  |  |
| $Ti_{0.9}Zr_{0.1}Mn_{1.65}Cr_{0.2}V_{0.15}$ | 20 | 0.59 | 44 | 83 | 37 | 4.873 | 7.999 |
|  | 0 | 3.36 | 251 | 89 | 224 |  |  |
|  | 20 | 3.16 | 237 | 92 | 218 |  |  |
| $Ti_{0.9}Zr_{0.1}Mn_{1.6}Cr_{0.2}V_{0.2}$ | 40 | 3.00 | 223 | 92 | 205 | 4.881 | 8.034 |
|  | 60 | 2.28 | 171 | 89 | 152 |  |  |
|  | 0 | 3.32 | 249 | 90 | 224 |  |  |
|  | 21 | 3.20 | 240 | 92 | 221 |  |  |
| $Ti_{0.9}Zr_{0.1}Mn_{1.4}Cr_{0.4}V_{0.2}$ | 40 | 3.05 | 229 | 92 | 210 | 4.882 | 8.005 |
|  | 60 | 2.58 | 193 | 91 | 176 |  |  |
|  | 0 | 3.30 | 247 | 85 | 210 |  |  |
|  | 21 | 3.15 | 239 | 97 | 231 |  |  |
| $Ti_{0.9}Zr_{0.1}Mn_{1.2}Cr_{0.6}V_{0.2}$ | 40 | 2.69 | 201 | 97 | 196 | 4.888 | 8.018 |
|  | 60 | 2.53 | 192 | 97 | 186 |  |  |
|  | 19 | 3.14 | 235 | 91 | 214 |  |  |
| $Ti_{0.9}Zr_{0.1}Mn_{1.4}Cr_{0.2}V_{0.4}$ | 40 | 3.05 | 229 | 90 | 205 | 4.883 | 8.015 |
|  | 24 | 2.91 | 223 | 55 | 122 |  |  |
| $Ti_{0.9}Zr_{0.1}Mn_{1.0}Cr_{0.8}V_{0.2}$ | 60 | 2.33 | 179 | 62 | 111 | 4.890 | 8.012 |
|  | 20 | 3.04 | 230 | 77 | 177 |  |  |
| $Ti_{0.9}Zr_{0.1}Mn_{0.8}Cr_{1.0}V_{0.2}$ | 40 | 2.91 | 220 | 77 | 169 | 4.903 | 8.027 |
|  | 18 | 3.28 | 241 | 75 | 181 |  |  |
| $Ti_{0.85}Zr_{0.15}Mn_{1.6}Cr_{0.2}V_{0.2}$ | 40 | 3.24 | 239 | 85 | 203 | 4.909 | 8.036 |

Table-continued

| Hydrogen storage alloy composition | Hydrogenation temp. (°C.) | Qty. absorbed hydrogen at. H mol.Alloy | Qty. absorbed hydrogen $H_2$(cc, at 20° C.) Alloy wt.(g) | Qty. released hydrogen Release ratio (%) | Qty. released hydrogen $H_2$(cc, at 20° C.) Alloy wt.(g) | Crystal lattice parameters a (Å) | Crystal lattice parameters c (Å) |
|---|---|---|---|---|---|---|---|
| | 19 | 1.13 | 81 | 82 | 67 | | |
| $Ti_{0.8}Zr_{0.2}Mn_{1.8}Cr_{0.1}V_{0.1}$ | 40 | 1.00 | 71 | — | — | 4.887 | 8.018 |
| | 16 | 3.18 | 228 | 75 | 171 | | |
| $Ti_{0.8}Zr_{0.2}Mn_{1.7}Cr_{0.2}V_{0.1}$ | 40 | 3.10 | 223 | 89 | 197 | 4.900 | 8.020 |
| | 19 | 3.30 | 239 | 71 | 170 | | |
| $Ti_{0.8}Zr_{0.2}Mn_{1.7}Cr_{0.1}V_{0.2}$ | 40 | 3.19 | 231 | 91 | 210 | 4.890 | 8.034 |
| | 25 | 3.27 | 243 | 88 | 213 | | |
| $Ti_{0.8}Zr_{0.2}Mn_{1.6}Cr_{0.2}V_{0.2}$ | 60 | 3.00 | 223 | 97 | 217 | 4.892 | 8.037 |
| | 20 | 3.28 | 233 | 76 | 176 | | |
| $Ti_{0.8}Zr_{0.2}Mn_{1.5}Cr_{0.3}V_{0.2}$ | 40 | 3.26 | 237 | 90 | 213 | 4.896 | 8.025 |
| | 24 | 3.31 | 246 | 86 | 211 | | |
| $Ti_{0.8}Zr_{0.2}Mn_{1.4}Cr_{0.4}V_{0.2}$ | 60 | 3.12 | 231 | 93 | 216 | 4.901 | 8.068 |
| | 25 | 3.21 | 240 | 89 | 214 | | |
| $Ti_{0.8}Zr_{0.2}Mn_{1.2}Cr_{0.6}V_{0.2}$ | 60 | 3.05 | 229 | 90 | 206 | 4.917 | 8.096 |
| | 26 | 3.19 | 240 | 80 | 191 | | |
| $Ti_{0.8}Zr_{0.2}Mn_{1.0}Cr_{0.8}V_{0.2}$ | 60 | 3.11 | 234 | 80 | 187 | 4.919 | 8.062 |
| | 25 | 3.22 | 242 | 74 | 178 | | |
| $Ti_{0.8}Zr_{0.2}Mn_{0.8}Cr_{1.0}V_{0.2}$ | 57 | 2.91 | 219 | 79 | 173 | 4.917 | 8.059 |
| | 24 | 3.21 | 241 | 64 | 153 | | |
| $Ti_{0.8}Zr_{0.2}Mn_{0.6}Cr_{1.2}V_{0.2}$ | 60 | 2.94 | 221 | 76 | 167 | 4.937 | 8.074 |
| | 23 | 3.47 | 260 | 18 | 46 | | |
| $Ti_{0.8}Zr_{0.2}Mn_{0.8}Cr_{0.8}V_{0.4}$ | 60 | 3.36 | 251 | 45 | 112 | 4.948 | 8.066 |
| | 23 | 3.51 | 264 | 21 | 56 | | |
| $Ti_{0.8}Zr_{0.2}Mn_{0.6}Cr_{1.0}V_{0.4}$ | 60 | 3.31 | 249 | 51 | 127 | 4.957 | 8.106 |
| | 20 | 3.34 | 233 | 32 | 73 | | |
| $Ti_{0.7}Zr_{0.3}Mn_{1.6}Cr_{0.3}V_{0.1}$ | 40 | 3.38 | 235 | 65 | 152 | 4.922 | 8.056 |
| | 20 | 3.15 | 245 | 14 | 33 | | |
| $Ti_{0.7}Zr_{0.3}Mn_{1.4}Cr_{0.2}V_{0.2}$ | 50 | 2.98 | 232 | 24 | 56 | — | — |
| $Ti_{0.6}Zr_{0.4}Mn_{1.4}Cr_{0.2}V_{0.2}$ | 23 | 3.30 | 31 | 13 | 31 | — | — |
| | 25 | 3.48 | 248 | 18 | 44 | | |
| $Ti_{0.6}Zr_{0.4}Mn_{0.8}Cr_{1.0}V_{0.2}$ | 60 | 3.32 | 237 | 44 | 104 | 4.958 | 8.113 |
| $Ti_{0.8}Zr_{0.2}Mn_{1.0}Cr_{0.8}Fe_{0.2}$ | 20 | 1.59 | 119 | 99 | 118 | 4.883 | 8.014 |
| | 0 | 2.91 | 218 | 99 | 216 | | |
| $Ti_{0.8}Zr_{0.2}Mn_{0.8}Cr_{1.0}Fe_{0.2}$ | 20 | 2.81 | 210 | 97 | 205 | 4.890 | 8.010 |
| | 20 | 2.14 | 154 | 91 | 141 | | |
| $Ti_{0.8}Zr_{0.2}Mn_{1.4}Cr_{0.4}Cu_{0.2}$ | 40 | 2.05 | 148 | 90 | 134 | 4.891 | 8.019 |
| | 40 | 3.19 | 215 | 60 | 129 | | |
| $Ti_{0.7}Zr_{0.3}Mn_{1.4}Cr_{0.2}Cu_{0.4}$ | 60 | 3.17 | 214 | 79 | 169 | 4.923 | 8.082 |
| | 20 | 3.25 | 224 | 15 | 34 | | |
| $Ti_{0.6}Zr_{0.4}Mn_{1.4}Cr_{0.4}Cu_{0.2}$ | 40 | 3.21 | 221 | 39 | 86 | 4.934 | 8.084 |
| | 60 | 3.12 | 215 | 83 | 179 | | |
| | 0 | 1.20 | 87 | 78 | 68 | | |
| $Ti_{0.8}Zr_{0.2}Mn_{1.4}Cr_{0.4}Ni_{0.2}$ | 20 | 0.60 | 44 | 77 | 33 | 4.876 | 8.001 |
| | 18 | 2.76 | 195 | 68 | 133 | | |
| $Ti_{0.9}Zr_{0.1}Mn_{1.6}Cr_{0.2}Nb_{0.2}$ | 40 | 2.45 | 173 | 71 | 124 | 4.900 | 8.047 |
| | 18 | 3.02 | 211 | 67 | 142 | | |
| $Ti_{0.85}Zr_{0.15}Mn_{1.65}Cr_{0.2}Nb_{0.15}$ | 40 | 2.64 | 186 | 72 | 133 | 4.903 | 8.048 |
| | 18 | 3.18 | 220 | 53 | 116 | | |
| $Ti_{0.8}Zr_{0.2}Mn_{1.4}Cr_{0.4}Nb_{0.2}$ | 40 | 3.14 | 217 | 61 | 132 | 4.928 | 8.092 |
| $Ti_{0.8}Zr_{0.2}Mn_{1.0}Cr_{0.8}Nb_{0.2}$ | 15 | 3.19 | 220 | 51 | 113 | 4.941 | 8.114 |
| | 25 | 2.80 | 195 | 75 | 147 | | |
| $Ti_{0.8}Zr_{0.2}Mn_{0.7}Cr_{1.0}Mo_{0.3}$ | 60 | 2.28 | 159 | 80 | 127 | 4.936 | 8.081 |
| $Ti_{0.8}Zr_{0.2}Mn_{1.6}Cr_{0.2}Ta_{0.2}$ | 17 | 2.51 | 156 | 44 | 69 | 4.918 | 8.058 |
| | 20 | 3.52 | 231 | 18 | 41 | | |
| $Ti_{0.8}Zr_{0.2}Mn_{1.6}Cr_{0.2}Ce_{0.2}$ | 40 | 3.51 | 230 | 52 | 119 | 4.910 | 8.056 |
| | 20 | 3.61 | 233 | 16 | 36 | | |
| $Ti_{0.8}Zr_{0.2}Mn_{1.6}Cr_{0.2}La_{0.2}$ | 40 | 3.71 | 240 | 45 | 108 | 4.929 | 8.064 |
| | 14 | 3.37 | 235 | 42 | 100 | | |
| $Ti_{0.8}Zr_{0.2}Mn_{1.7}V_{0.2}Mo_{0.01}$ | 40 | 3.28 | 227 | 81 | 184 | 4.917 | 8.050 |
| $Ti_{0.7}Zr_{0.2}Mn_{1.7}V_{0.1}Mo_{0.03}$ | 20 | 2.70 | 181 | 80 | 144 | 4.929 | 8.074 |

From the Table, it is confirmed that the hydrogen storage alloys of the invention absorb large amounts of hydrogen.

The invention will be described in more detail below with reference to the alloy composition range.

Figure 1:
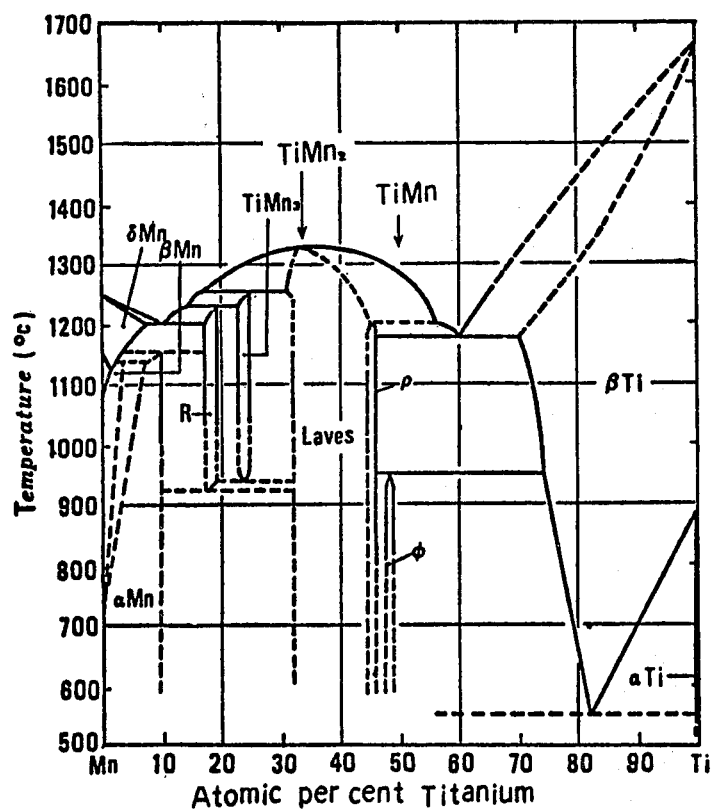
Figure 2:
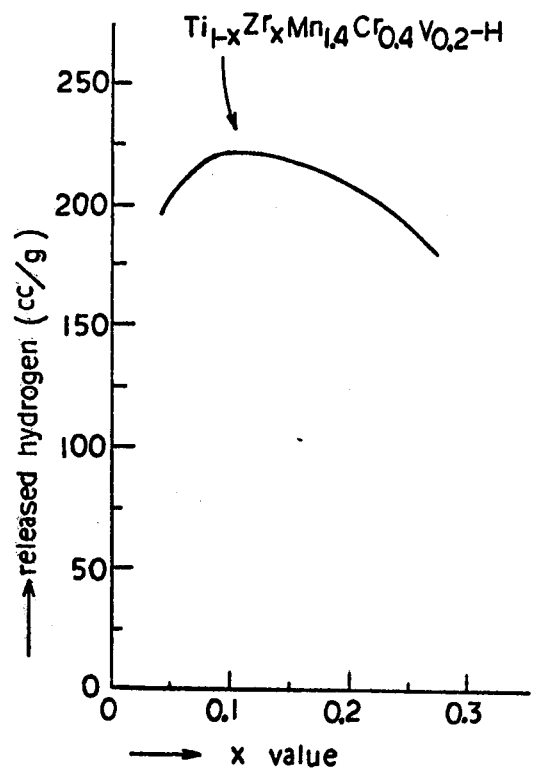
FIG. 2 is a graph showing the relationship between an amount of released hydrogen (cc/g) at room temperature and the value of x for a compound having the general formula Ti$_{1-x}$Zr$_x$Mn$_{1.4}$Cr$_{0.4}$V$_{0.2}$ which is an example of Ti-Zr-Mn-Cr-V alloys according to this invention.
Figure 3:
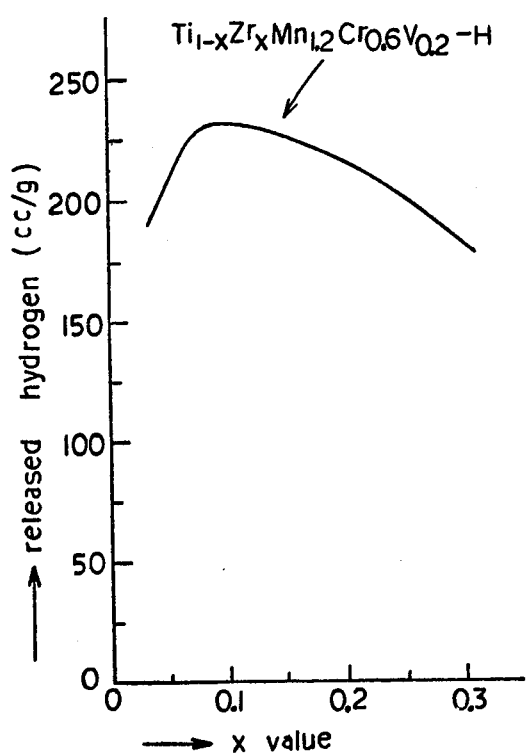
FIG. 3 is a similar drawing showing the relationship between the amount of released hydrogen (cc/g) at room temperature and the value of x for a compound having the general formula Ti$_{1-x}$Zr$_x$Mn$_{1.2}$Cr$_{0.6}$V$_{0.2}$.
Figure 4:
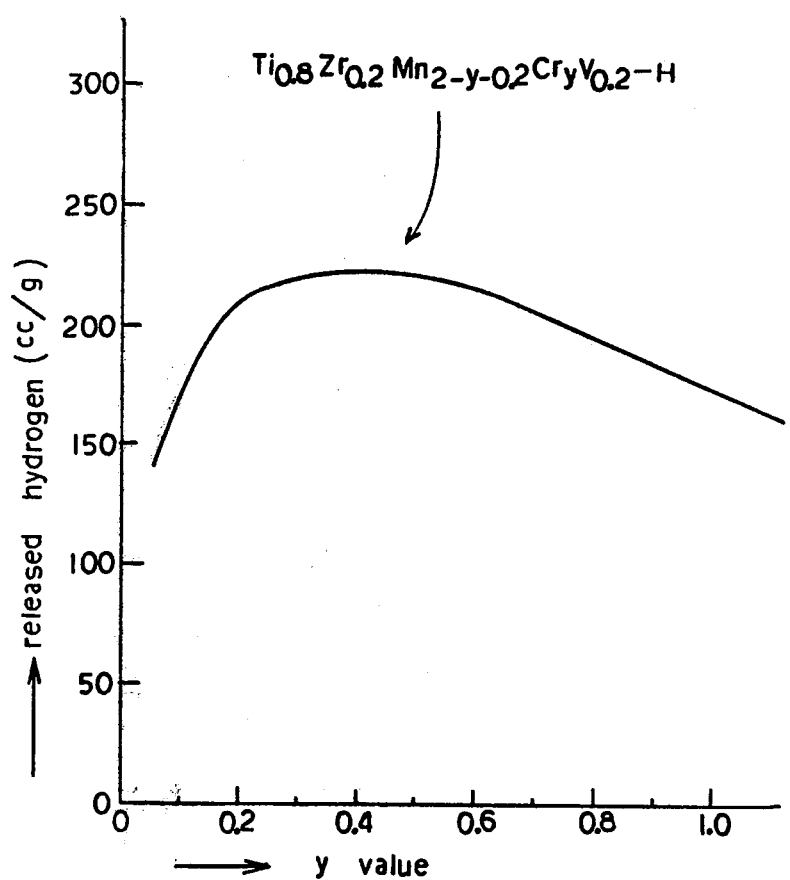
FIG. 4 is a similar drawing showing the relationship between the amount of released hydrogen (cc/g) at room temperature and the value of y for a compound having the general formula Ti$_{0.8}$Zr$_{0.2}$Mn$_{2-y-0.2}$Cr$_y$V$_{0.2}$.
Figure 5:
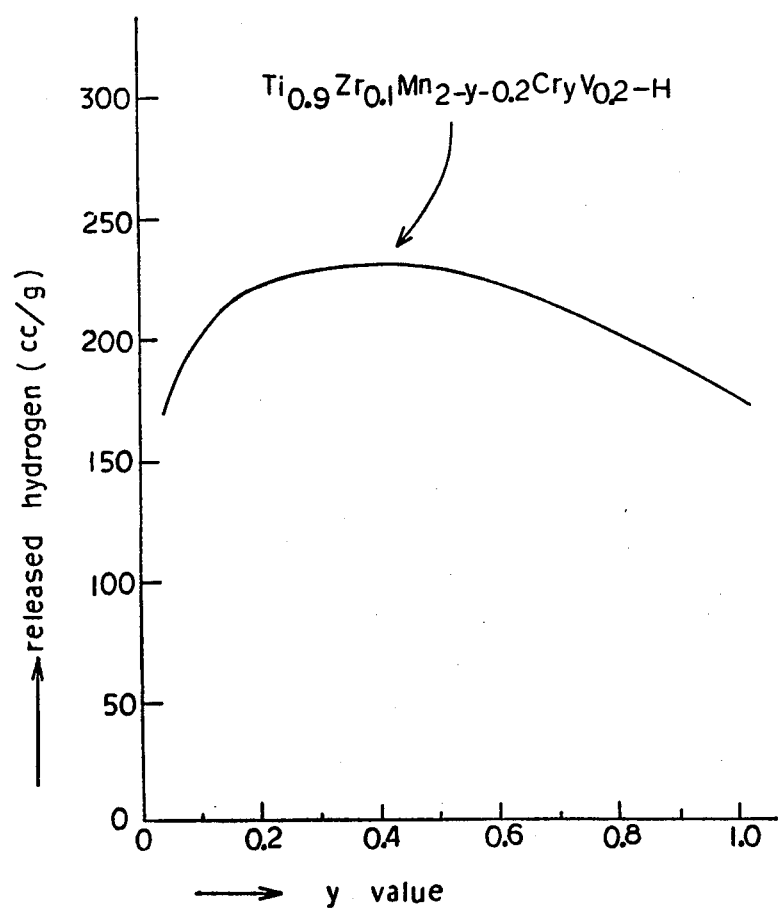
FIG. 5 is a similar drawing showing the relationship between the amount of released hydrogen (cc/g) at room temperature and the value of y for a compound having the general formula Ti$_{0.9}$Zr$_{0.1}$Mn$_{2-y-0.2}$Cr$_y$V$_{0.2}$.
Figure 6:
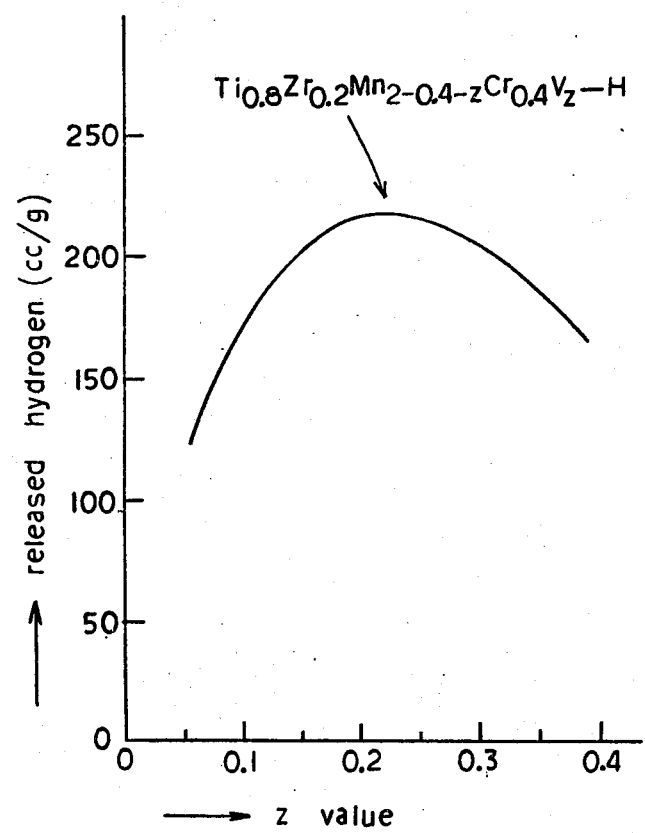
FIG. 6 is a similar drawing showing the relationship between the amount of released hydrogen (cc/g) at room temperature and the value of Z for a compound having the general formula $Ti_{0.8}Zr_{0.2}Mn_{2-0.4-z}Cr_{0.4}V_z$.
Figure 7:
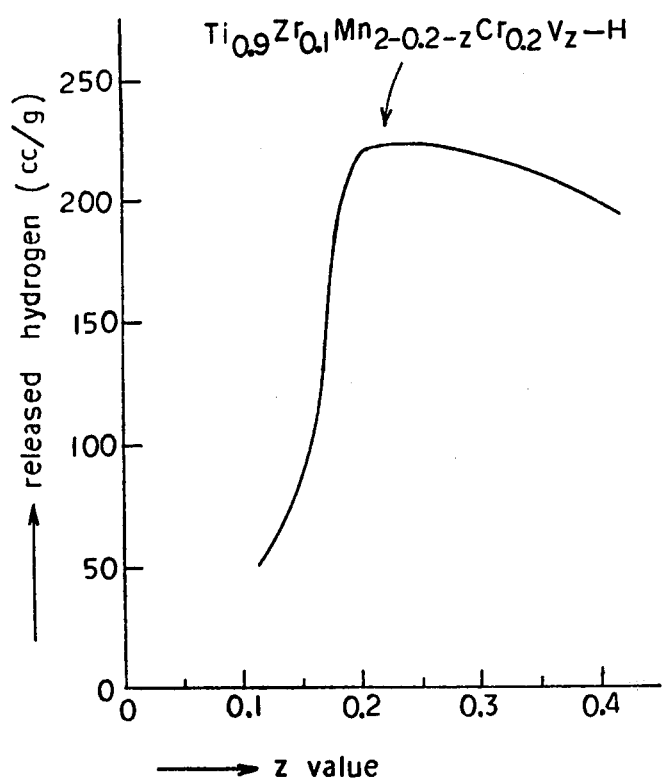
FIG. 7 is a similar drawing showing the relationship between the amount of released hydrogen (cc/g) at room temperature and the value of Z for a compound having the general formula $Ti_{0.9}Zr_{0.1}Mn_{2-0.2-z}Cr_{0.2}V_z$.

A phase diagram for a Ti-Mn binary alloy system given by Waterstrat et al. is shown in FIG. 1, wherein there are shown TiMn, $TiMn_2$ and $TiMn_3$ as intermetallic compounds, and $\phi$ phase, $\rho$ phase and Laves phase as interphases. These inventors indicated formerly that Ti-Mn binary alloys having good hydrogen absorption and desorption characteristics are alloys wherein the alloy phase substantially belongs to the Laves phase of the intermetallic compound, the crystal structure thereof is a hexagonal crystal series $MgZn_2$ type (C 14 type), and crystal lattice contains a and c being 4.80 to 5.10 (Å) and 7.88-8.28 (Å), respectively.

In FIG. 1, the composition range of the alloy to form a single and homogeneous $MgZn_2$(C14) crystal structure lies in the range which includes a part of Laves phase. However, in spite of the other composition ranges, it is possible to obtain a alloy whose matrix phase is constituted substantially by a Laves phase which has hexagonal crystal structure of the $MgZn_2$ type although inhomogeneous phases are mixed therein, if the Ti-Mn binary alloy has the composition falling in the range of $TiMn_{1.0}$–$TiMn_{3.0}$.

Among Ti-Mn binary alloys, alloys having the Laves phase and the crystal lattice parameters being a=4.80-4.90 (Å) and c=7.89-8.03 (Å), show excellent hydrogen absorption and desorption characteristics, but every alloy with the composition falling in the range of, $TiMn_{1.0}$–$TiMn_{3.0}$ does not show good hydrogen storage characteristics. This invention providing alloys having excellent storage characteristics is achieved by partially substituting the composition of Ti-Mn binary alloys with the composition of $TiMn_{1.0}$–$TiMn_{3.0}$, for third, fourth, fifth, or further elements, such as Zr(for Ti), Cr, V, Cu, Fe, Mo (for Mn).

As will be seen from the former Table, the lattice parameters tend to increase as the Zr (or Hf) substitutive ratio becomes larger, and thereby an amount of absorbable hydrogen increases at a predetermined temperature, but the hydrogen dissociation pressure tends to decrease as the lattice parameters become larger and thereby an amount of releasable hydrogen decreases under atmospheric pressure and at room temperature. Therefore, the Zr (or Hf) substitutive ratio for Ti have to be limited to a suitable range in order to keep the amount of releasable hydrogen large as well as the amount of absorbable hydrogen. Furthermore, if the proportion of Zr (or Hf) component for Ti becomes larger, the degree of the homogeneity, singleness and crystallization of the alloy tend to become inferior, and thereby the plateau region on hydrogen dissociation equilibrium pressure-metal hydride composition isotherms becomes unclear, resulting in inferior hydrogen characteristics. It is therefore concluded that the Zr (or Hf) substitutive atomic percentage for Ti should be kept within 0-50 at. %.

Furthermore, the data in Table, show that the amount of absorbed hydrogen tends to increase as the Cr and V (for example) substitutive ratio for Mn decreases. The hydrogen dissociation pressure becomes lower by decreasing the Cr and V (for example) substitutive ratio for Mn, and the amount of released hydrogen decreases under the atmospheric pressure at room temperature for the same reason as Zr (or Hf) substitutive ratio for Ti. The Cr and V (for example) substitutive ratio for Mn therefore have to be limited to a suitable range in order to keep the amount of released hydrogen large as well as the amount of absorbed hydrogen. In addition, the hydride speed at an initial stage decreases at room temperature by increasing the substitutive ratio for Mn and thereby the hydride storage capability alloy is rather impaired. Accordingly, the Cr and V (for example) substitutive atomic percentage for Mn should be kept within 0-70 at. %.

There are many factors for evaluating a material for storage, preservation and transport of hydrogen. They are, for example, the ease of forming the hydride at an initial stage, the hydrogen absorption and desorption speed, the operating temperature for hydrogen absorption and desorption, the hydrogenating pressure, the amount of the absorbed and desorbed hydrogen per unit weight of the alloy, the flatness and wideness of the plateau pressure region in hydrogen dissociation pressure-composition isotherm and the cost of raw material. The Ti-Mn alloy previously proposed by these inventors was superior in the above listed factors.

However, if we give attention to a practical use as a hydrogen storage, it may be considered that the amount of the absorbed and desorbed hydrogen per unit weight of the alloy, and the flatness and wideness of the plateau pressure region are most important of the all factors.

This invention is very superior in the above two factors to the former Ti-Mn alloys.

As examples of the hydrogen storage materials of this invention, there were prepared alloys having the general formula; $Ti_{1-x}Zr_xMn_{2-y-z}Cr_yV_z$. These alloys are obtained by employing $TiMn_2$ as the base material and partially substituting Titanium for zirconium and manganese for chromium and vanadium. In these materials, it is desirable that the values of x and y respectively lie in the ranges of x=0.05-0.4 and y=0-1.0 (wherein y≠0) for surfisfying the above described conditions such that the substitutive ratio for Ti or Mn have to be limited to a suitable range in order to keep the amount of released hydrogen large as well as the amount of absorbed hydrogen. As for the Z value being the substitution ratio of V to Mn, if it becomes larger, the lattice parameters tend to increase in the same way as the X value and thereby the hydrogen dissocation pressure tends to decrease. Moreover, if the z value is more than 0.4, the degree of homogeneity and crystallization of the alloy tends to be inferior and thereby the amount of absorbed hydrogen decreases.

In the following, there will be described the composition range of the $Ti_{1-x}Zr_xM_{z-y-z}Cr_yV_z$ alloy which shows particularly excellent hydrogen storage characteristics. Shown in FIGS. 2-7 are the relationship between the amount of released hydrogen (cc/g) at room temperature and values of x, y and z. In order that the $Ti_{1-x}Zr_xMn_{2-y-z}Cr_yV_z$ alloy system exhibited clear superiority in a practical use over a conventional high pressure vessel system or cryogenic liquid system, it is preferred that the amount of released hydrogen exceed 200 cc/g. Therefore, as will be seen from FIGS. 2-7, values of x, y and z should be kept in the following ranges:

$x = 0.05-0.22$ $y = 0.16-0.75$ $z = 0.16-0.32$

Figure 8:
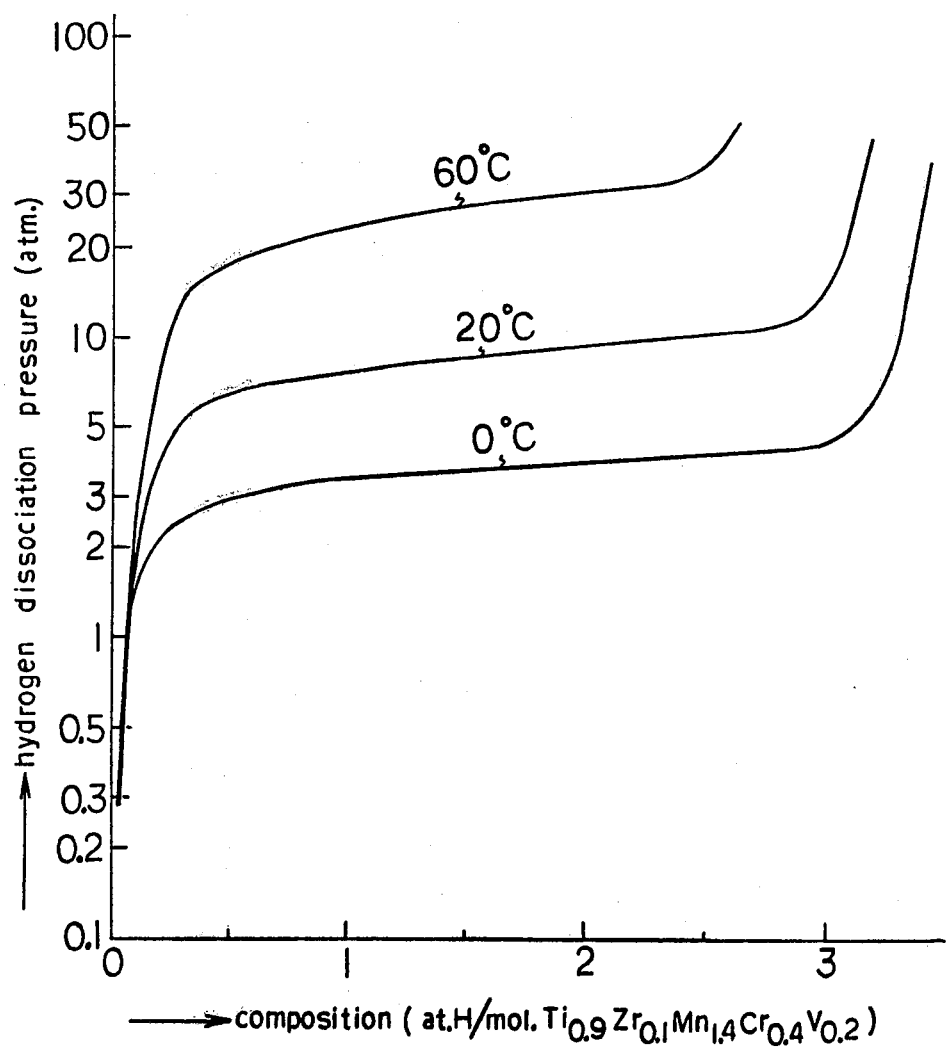
FIG. 8 is a graph which plots hydrogen dissociation equilibrium pressure-composition isotherms for the $Ti_{0.9}Zr_{0.1}Mn_{1.4}Cr_{0.4}V_{0.2}$—H system by way of example of the hydrogenation characteristics of a Ti-Zr-Mn-Cr-V alloy according to the invention.
Figure 9:
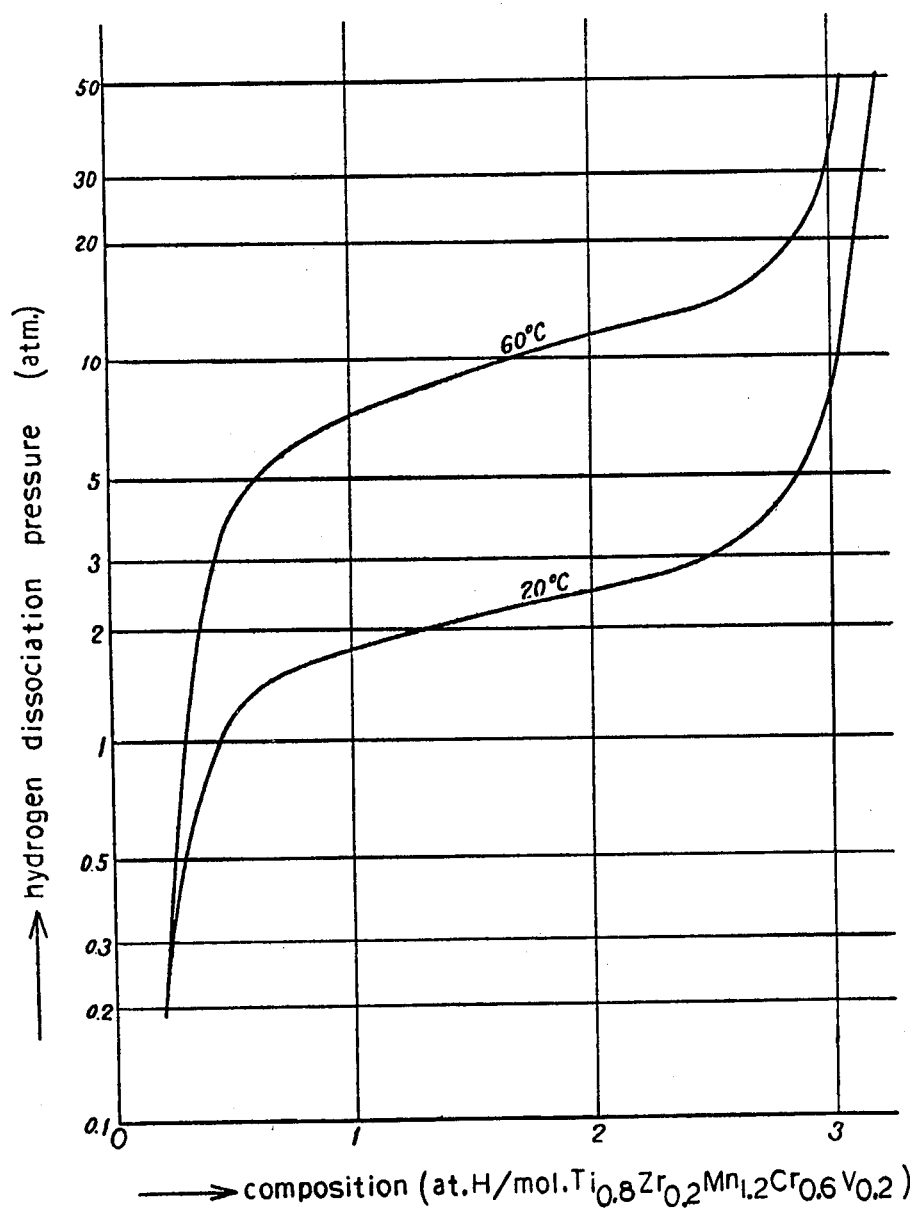
FIG. 9 is a similar drawing which plots hydrogen dissociation equilibrium pressure-composition isotherms for the $Ti_{0.8}Zr_{0.2}Mn_{1.2}Cr_{0.6}V_{0.2}$—H system.
Figure 10:
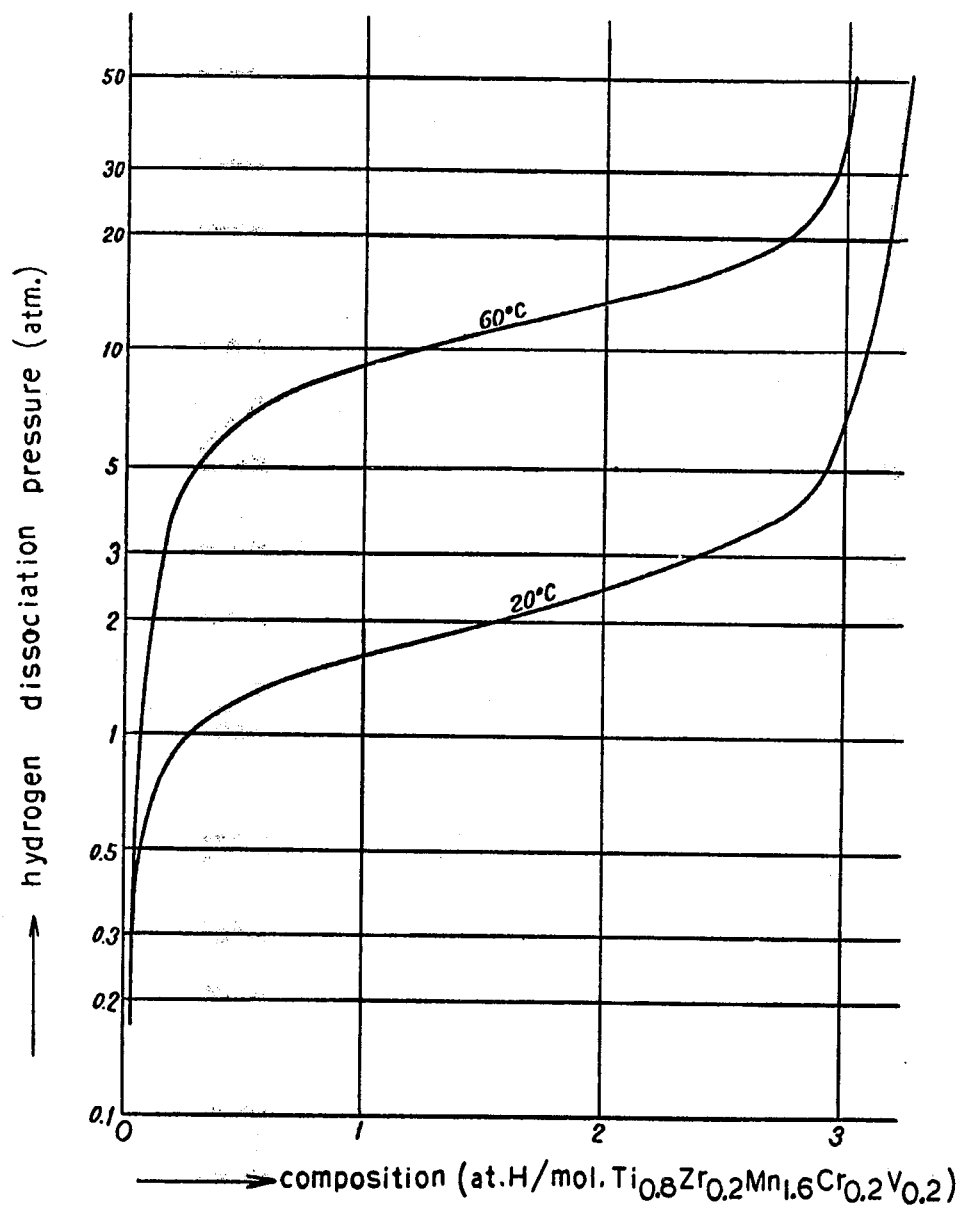
FIG. 10 is a similar drawing which plots hydrogen dissociation equilibrium pressure-composition isotherms for the $Ti_{0.8}Zr_{0.2}Mn_{1.6}Cr_{0.2}V_{0.2}$—H system.
Figure 11:
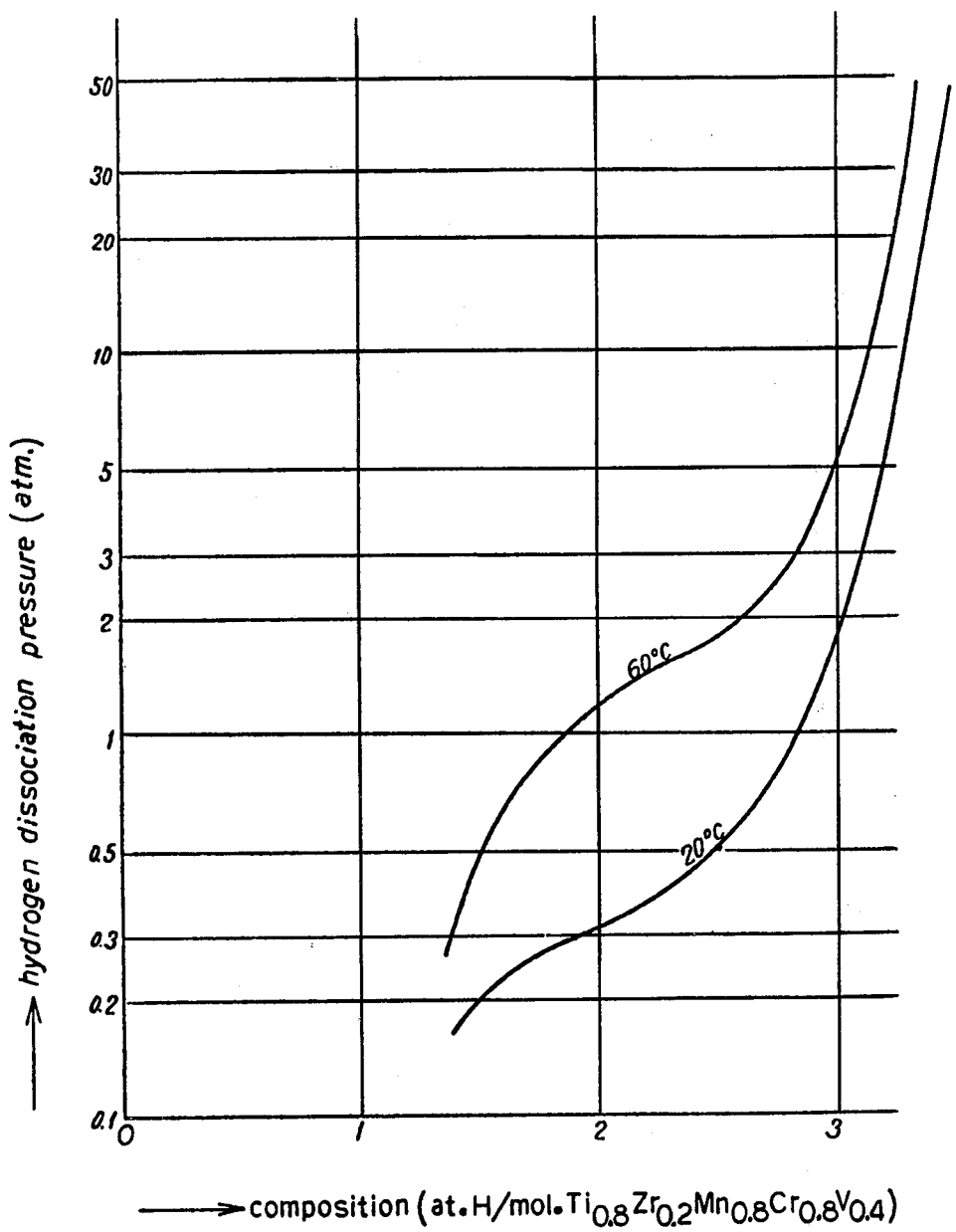
FIG. 11 is a similar drawing which plots hydrogen dissociation equilibrium pressure-composition isotherms for the $Ti_{0.8}Zr_{0.2}Mn_{0.8}Cr_{0.8}V_{0.4}$—H system.
Figure 12:
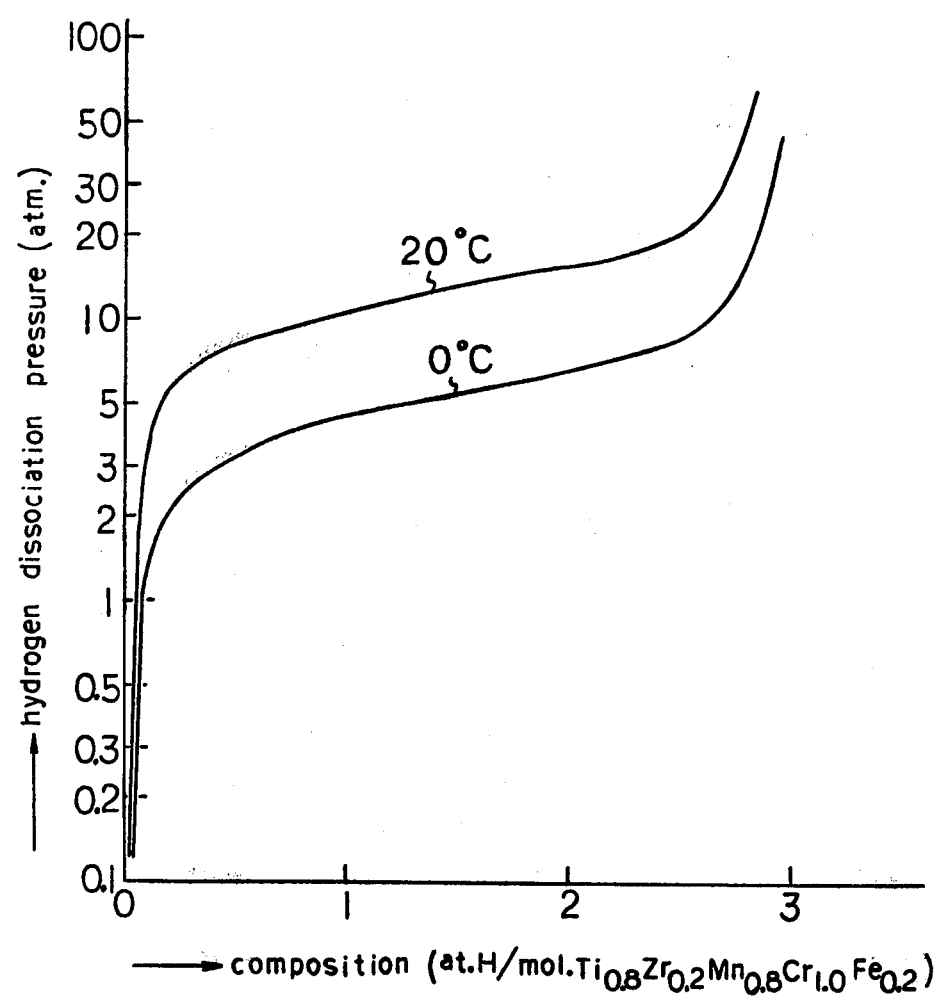
FIG. 12 is a graph which plots hydrogen dissociation equilibrium pressure-composition isotherms for the $Ti_{0.8}Zr_{0.2}Mn_{0.8}Cr_{1.0}Fe_{0.2}$—H system by way of example of the hydrogenation characteristics of a Ti-Zr-Mn-Cr-Fe alloy according to the invention.

The isotherms (called p-x-t property) plotted on the graph whose vertical axis is used to express a logarithm of the hydrogen dissociation pressure and horizontal axis, a hydride composition (the number of hydrogen atoms per an alloy molecule), are very useful to evaluate hydrogen storge matericals. As an example of the invention, hydrogen dissociation equilibrium pressure-hydride composition isotherms for the system of $Ti_{0.9}Zr_{0.1}Mn_{1.4}Cr_{0.4}V_{0.2}$—$H_x$ are shown in FIG. 8, similar curves for the system $Ti_{0.8}Zr_{0.2}Mn_{1.2}Cr_{0.6}V_{0.2}$—$H_x$, in FIG. 9, similar curves for the system $Ti_{0.8}Zr_{0.2}Mn_{1.6}Cr_{0.2}$—$H_x$, in FIG. 10, similar curves for the system $Ti_{0.8}Zr_{0.2}Mn_{0.8}Cr_{0.8}V_{0.4}$—$H_x$, in FIG. 11, similar curves for the system $Ti_{0.8}Zr_{0.2}Mn_{0.8}Cr_{1.0}Fe_{0.2}$—$H_x$, in FIG. 12, similar curves for the system $Ti_{0.6}Zr_{0.4}Mn_{1.4}Cr_{0.4}Cu_{0.2}$—$H_x$, in FIG. 13, and similar curves for the system $Ti_{0.8}Zr_{0.2}Mn_{1.7}V_{0.2}Mo_{0.1}$—$H_x$, in FIG. 14.

The each of these hydrogen dissociation pressure-composition isotherms has a nearly horizontal plateau region at the peculiar temperature region. In such plateau regions, the above materials can absorb relatively large amounts of hydrogen under little change of hydrogen pressure and can release large amounts of hydrogen absorbed. Thus, the wider the plateau region is, the larger the amount of released hydrogen is and the more available the metal hydride is for the use.

The alloy of this invention hardly forms a layer of nitride or oxide, is almost never influenced by impurities in the hydrogen gas, easily absorbs hydrogen in a short time, and reversibly releases high purity hydrogen. Accordingly the material of the invention can also be used for purifying the hydrogen.

What is claimed is:

1. A material for storage of hydrogen comprising an alloy represented by the formula AB$\alpha$ in which A comprises from 50 to below 100 (exclusive) atomic percent of titanium and remainder being zirconium, B comprises from 30 to below 100 (exclusive) atomic percent of manganese and the remainder containing vanadium and one element selected from the group consisting of chromium and molybdenum, and $\alpha$ is a value indicating the ratio of B to A, and is in the range of 1.0 to 3.0.

2. Material as claim in claim 1, wherein said formula is specified as $Ti_{1-x}Zr_xMn_{2-y-z}Cr_yV_z$, in which values x, y and z are in the following range: $0.05 \leq x \leq 0.4$, $0 < y \leq 1.0$ and $0 < z \leq 0.4$, 3. Material as claimed in claim 2, wherein said value x is in the range from 0.05 to 0.22, said value y is in the range from 0.16 to 0.75 and said value z is in the range from 0.16 to 0.32.

4. Material as claimed in claim 1, wherein said A consists of titanium and zirconium and said B consists of manganese, vanadium and molybdenum.

5. Hydride of material claimed in claim 1.

6. A hydride of an alloy represented by the formula AB$\alpha$ in which A comprises from 50 to below 100 (exclusive) atomic percent of titanium and remainder being zirconium, B comprises from 30 to below 100 (exclusive) atomic percent of manganese and the remainder containing vanadium and one element selected from the group consisting of chromium and molybdenum, and $\alpha$ is a value indicating the ratio of B to A, and is in the range of 1.0 to 3.0, said hydride being produced by reacting said alloy with hydrogen.

* * * * *